Sept. 14, 1965  M. SPERTUS  3,205,599
METAL PHOTO FRAME WITH MECHANICALLY FORMED ANGLE JOINT
Filed March 6, 1963
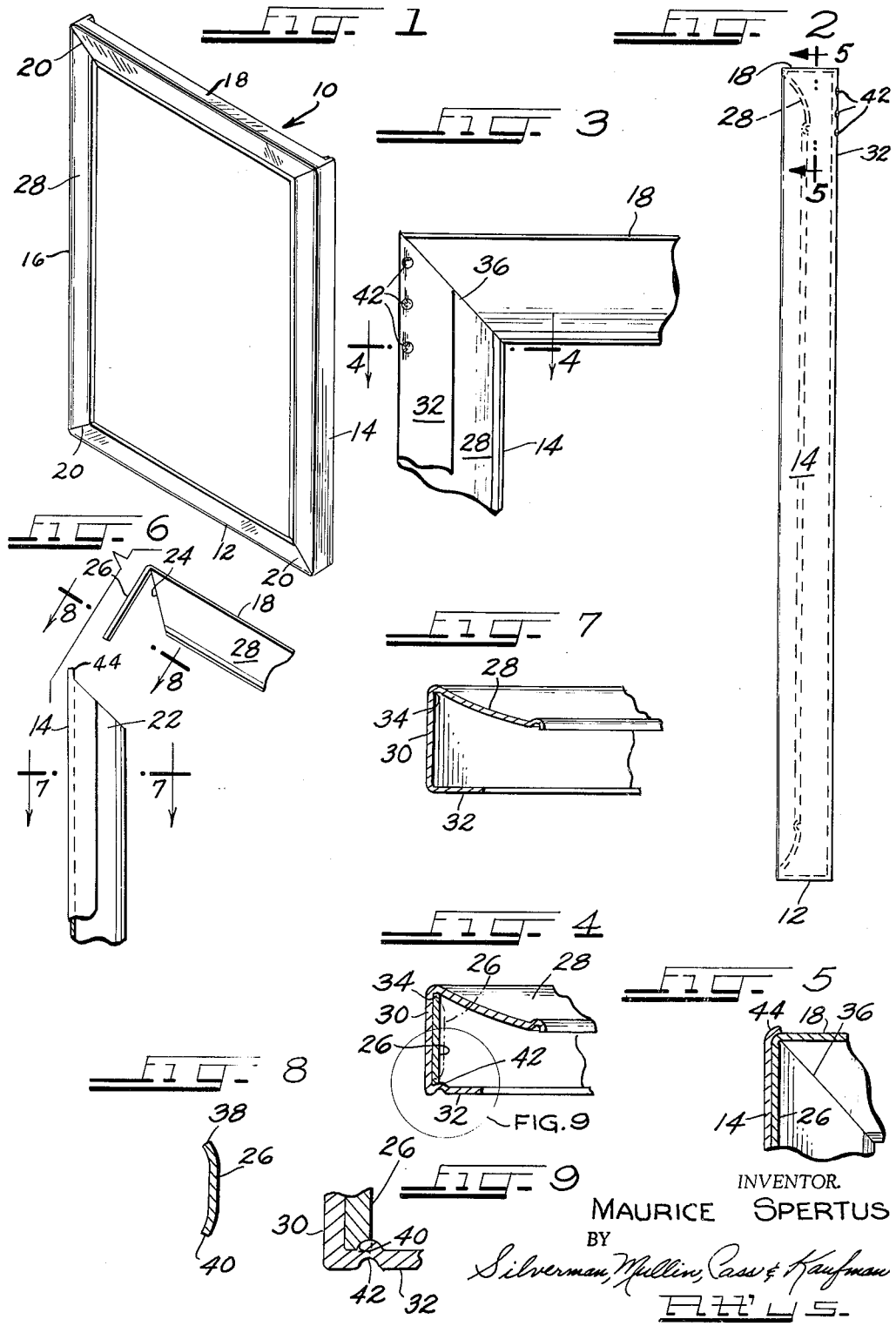
INVENTOR.
MAURICE SPERTUS
BY
Silverman, Mullin, Cass & Kaufman
ATT'YS.

United States Patent Office 3,205,599
Patented Sept. 14, 1965

3,205,599
METAL PHOTO FRAME WITH MECHANICALLY FORMED ANGLE JOINT
Maurice Spertus, Highland Park, Ill., assignor to R & E Moulding Corporation, Chicago, Ill., a corporation of Delaware
Filed Mar. 6, 1963, Ser. No. 263,233
5 Claims. (Cl. 40—152)

This invention relates to metal photo and picture frames, and more particularly to improvements in an angle joint for joining together the free ends of the strip from which the frame is made.

It is well known that metal picture and photo frames may be made from a single strip of metal of modified channel cross-section which is mitered and bent at the corners to afford, for example, a rectangular shaped frame. The free ends of the strip are brought into abutting relationship and then joined together by any suitable means.

Heretofore, inexpensive efficient spot welding means was often used to join the ends of the strip together. The resistance type process of spot welding was found to be the most inexpensive yet efficient and required the least complicated and least expensive equipment. However, such resistance process spot welding can be utilized only on electrically conductive materials such as steel, etc. When non-conductive materials or conductive materials having non-conductive coatings are used, the resistance welding process is ineffective. Instead, other welding processes requiring much more complicated and expensive equipment, as well as more skillful operators, are required. This, of course, is an important factor in modern mass-production manufacture of inexpensive picture frames.

In view of the foregoing, it is an important object of this invention to provide a method and means, in the form of a mechanical joint, which entirely eliminates the necessity for utilizing heat welding processes of any type to join together the ends of the picture framing strip in the manufacture of such picture frames.

An object relating thereto is to provide an extension or tab on one end of said strip so that the same may be inserted in the other end of said channel-shaped strip and then mechanically joining the tab and the complementary strip end together in immovable secure relationship.

Another object is to afford a mechanical metal picture frame joint secure enough to withstand any and all normal disruptive forces to which such frames might be subjected, including tension, compression, torsion, etc.

A further object is to provide a mechanical metal picture frame joint so positioned and disguised that it does not detract from the esthetic appearance of the picture frame itself.

Yet another object is to afford a mechanical metal picture frame joint in which securement is achieved by more than one means, each of said means supplementing the other, whereby failure of one of the means will not per se result in rupture of the joint.

Yet a further object is to provide a metal photo frame joint capable of being made with simple, inexpensive equipment on a mass production basis.

Still a further object is to afford a metal photo frame mechanical joint which is simple, effective, strong, durable, inexpensive and substantially hidden from view.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a perspective view of a photo or picture frame incorporating therein my improved mechanical joint;

FIG. 2 is a side elevational view thereof;

FIG. 3 is an enlarged fragmentary view of the corner of said frame as viewed from the rear, and showing the joint;

FIG. 4 is a fragmentary sectional view taken on the plane of line 4—4 in FIG. 3 of the drawings and viewed in the direction indicated;

FIG. 5 is a fragmentary sectional view taken on the plane of line 5—5 in FIG. 2 of the drawings and viewed in the direction indicated;

FIG. 6 is a fragmentary exploded view showing the corner ends of the frame strip prior to assembly of the same;

FIG. 7 is an enlarged fragmentary sectional view taken on the plane of line 7—7 in FIG. 6 of the drawings and viewed in the direction indicated;

FIG. 8 is an enlarged detail sectional view taken on the plane of line 8—8 in FIG. 6 of the drawings and viewed in the direction indicated.

FIG. 9 is a magnified view showing a detail of construction as illustrated in FIG. 4 of the drawings.

Turning now to the several figures of the drawings, reference numeral 10 indicates generally a metal picture frame of generally rectangular shape comprising a bottom frame segment 12, a pair of side frame segments 14 and 16 and a top frame segment 18. The various segments of the frame may be formed from a single strip of metal miter-cut and bent at the corners, such as at 20. The free ends 22 and 24 of the strip (see FIG. 6) are likewise miter-cut as shown, with free end 24 having a tab or projecting tongue 26 integrally formed therewith, the purpose of which will become apparent as the description proceeds.

Referring now to FIG. 7 of the drawings, it will be noted that the cross-sectional shape of the frame strip is substantially channel-like with a front wall segment 28, a flat side wall segment 30 and a flat rear wall segment 32, the width of which may be substantially less than that of the front segment 28. The front segment 28 may be of almost any desired shape or configuration, as dictated by the esthetic design of the frame. The top frame segment 18 does not have a rear wall segment 32, and in fact, the side wall segment 30 of said top frame segment may be narrower than the equivalent segment of the other end and sides of the frame. This is to provide a slot through which a pane of glass, the photograph, and other components of the framed photograph or picture may be inserted into the frame. It should further be noted, in FIGS. 4 and 7 of the drawings, that the front wall 28 is joined to the side wall 30 in such a manner as to afford a corner or shoulder 34, the purpose of which will become apparent as the description proceeds.

As shown in FIG. 6 of the drawings, the strip end 24 is formed with an extension or tab 26 which actually may comprise an extension of the side wall segment 30. The tab 26 is bent at right angles to the top frame segment 18 and, as shown in FIG. 8 of the drawings, may be of slightly arcuate cross-section. Again, the purpose of this particular shape will become evident as the description proceeds.

To assemble the joint, the ends 22 and 24 of the strip are brought into abutment, thereby forming the joint line 36, as shown in FIGS. 3 and 5 of the drawings. As the ends 22 and 24 are brought into abutment, the tongue 26 is inserted into the tunnel of the end 22. This is facilitated by the fact that the width of the tongue 26 may be slightly less than the width of the wall segment 30. As shown in dotted outline in FIG. 4 of the drawings, the slightly curved tongue 26 is positioned adjacent the inner surface of the side wall segment 30. One side 38 of the tongue 26 may be positioned adjacent the front shoulder or corner 34 and the other side 40 may be positioned adjacent the rear wall segment 32. The assembled joint may then be positioned in a die or other suitable tool whereby the tongue 26 is flattened with consequent expansion of the width thereof to the point where side 38 is brought into tight abutment with (if not actually digging into) the shoulder 34. Simultaneously, adjacent portions of the rear wall segment 32 are impacted and crimped, forming a plurality of spaced apart dimples such as 42 which may actually bite into the side 40 of the tab 26, as shown in FIGS. 4 and 9 of the drawings. Thus, the tab 26 is confined in tight-fitting relationship between the rear wall segment 32 and the front wall corner or shoulder 34 in such a manner as to ensure a tight, substantially immovable joint. To ensure permanency of the joint, the crimped dimple 42 may actually bite into the tongue itself, thereby ensuring a substantially permanent mechanical joint capable of withstanding even comparatively severe torsional stresses.

In order to ensure even further the permanency and strength of the joint, the end 22 of the frame strip may be formed with a slight upwardly projecting tab 44 which may be bent or lapped around the corner of the joint, as shown in FIG. 5 of the drawings.

From the above description and drawings, it should be apparent that I have provided a simple but effective mechanical joint for joining together the ends of a length of photo frame strip to form a photo frame. The joint eliminates entirely the necessity for welding, riveting or any other fastening means and is especially suitable and convenient for fabricating frames made of electrically non-conductive material or of material which has been coated with non-conductive coatings such as vinyl, lacquer and the like.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. A metal photo frame with a mechanically formed angle joint comprising; a length of channel-shaped strip mitered and bent to afford a rectangular frame, the cross-section of at least three sides of said frame including a shaped front wall segment, a flat side wall segment and a rear wall segment, the width of said rear wall segment being less than that of said front wall segment, the free ends of said strip being miter cut, one end of said strip being formed with a projecting tab, said tab being integrally formed with and perpendicularly bent to the side wall segment of said strip end, said tab being inserted into the other strip end so that said mitered strip ends abut each other, said tab and adjacent strip end being crimped together in substantially immovable relationship by means of a plurality of dimples formed in said strip end, said dimples at least partially biting into the adjacent edge of said strip, said tab being slightly arcuate in cross-section prior to said crimping whereby said tab is flattened by said crimping thereby expanding until the edges thereof abut tightly the adjacent corners of said channel.

2. In a picture frame formed from a single strip of substantially channel shaped metal, a joint comprising:
 a tab integrally formed at one end of said strip and having an initial shape and an operative shape, said tab in said initial shape being dimensioned to fit within said channel and having a slightly arcuate cross-section, said tab in said operative shape being substantially more flat than in said initial shape to cause the edges thereof to tightly abut against the inside of said last-mentioned end in substantially an immovable relationship.

3. The picture frame of claim 2 in which said last mentioned strip end includes dimples positioned to cause the structure of said last mentioned strip end to embed within adjacent portions of said tab, thereby further mechanically joining said last mentioned strip end with said tab in substantially an immovable relationship.

4. The picture frame of claim 2 in which each section of said channel-shaped strip comprises a front wall segment, an integrally formed side wall segment and a rear wall segment, said tab comprising an extension of said side wall segment, said front segment and said side wall segment affording a front corner, said rear wall segment and said side wall segment affording a rear corner, said tab being dimensioned in said initial shape to fit into said channel with the edges thereof abutting said corners in tight fitting relationship.

5. The picture frame of claim 2 in which said last-mentioned strip end is formed with a slight extension, said extension being lapped around said first-mentioned strip end, when said tab is positioned within the channel of said last-mentioned strip end.

References Cited by the Examiner

UNITED STATES PATENTS

| 1,291,375 | 1/19 | Berg | 40—152 |
| 1,649,363 | 11/27 | Parsons | 29—521 X |
| 2,026,311 | 12/35 | Harris | 113—120 |
| 2,161,396 | 6/39 | Wittel | 40—152 |
| 2,521,603 | 9/50 | Prew | 40—152 |

EUGENE R. CAPOZIO, *Primary Examiner.*

JEROME SCHNALL, LEONARD W. VARNER,
*Examiners.*